United States Patent [19]

Hotomi et al.

[11] Patent Number: 4,906,537
[45] Date of Patent: Mar. 6, 1990

[54] SECONDARY CELL

[75] Inventors: Hideo Hotomi, Osaka; Yumiko Takedomi, Saga, both of Japan

[73] Assignee: Minolta Camera Kabushiki Kaisha, Osaka, Japan

[21] Appl. No.: 260,072

[22] Filed: Oct. 20, 1988

[30] Foreign Application Priority Data

Oct. 22, 1987 [JP] Japan .................. 62-268688

[51] Int. Cl.$^4$ ............................. H01M 10/40
[52] U.S. Cl. ...................... 429/192; 204/430
[58] Field of Search .................. 429/192; 204/430

[56] References Cited

U.S. PATENT DOCUMENTS

| 4,520,086 | 5/1985 | Skotheim | 429/192 |
| 4,562,725 | 1/1986 | Oka et al. | 204/430 |
| 4,664,761 | 5/1987 | Zupancic et al. | 429/192 |
| 4,722,877 | 2/1988 | Sammells | 429/192 |

FOREIGN PATENT DOCUMENTS 0896800 5/1962 United Kingdom ............... 429/192

Primary Examiner—Donald L. Walton
Attorney, Agent, or Firm—Burns, Doane, Swecker & Mathis

[57] ABSTRACT

The invention provides a new secondary cell with a solid electrolyte layer wherein the solid electrolyte layer comprises a plasma-polymerized layer of an organic compound containing an alkali metal ion and an element with high electronegativity.

11 Claims, 1 Drawing Sheet

SECONDARY CELL

BACKGROUND OF THE INVENTION

This invention relates to an all-solid type secondary cell which can perform electric charging and electric discharging A secondary cell can be charged even after its discharging to use it again and repeatedly. There have been conventionally known secondary cells as a lead storage battery and an alkali storage battery. Recently, a nickel-cadmium battery or a lithium secondary cell has been developed to meet the requirements of small-type or portable-type.

A secondary cell is basically constituted of a positive electrode, an electrolyte layer and a negative electrode. The electrolyte layer is constituted of an electrolyte solution. The electrolyte solution is prepared by dissolving electrolyte such as lithium perchlorate in an organic solvent such as propylene carbonate. A secondary cell composed of an electrolyte solution has such defects in durability as caused by solution leakage or decomposition of electrolyte.

As an effective means to overcome above-mentioned defects caused by an electrolyte solution, it has been proposed to apply solid electrolyte to a secondary cell (for example NIKKEI NEW MATERIALS page 33–page 45, Aug. 11, 1986).

There is proposed an electrolyte layer constituted of solid electrolyte (hereinafter referred to as "a solid electrolyte layer") wherein inorganic materials such as lithium silicate lithium phosphate ($Li_{3.6} Si_{0.6} P_{0.4} O_4$) are utilized, or lithium trifluoro methane sulfonate etc. is dispersed in polymeric thin layer such as polyethylene oxide, for the formation of the solid electrolyte layer. Solid electrolyte does not give rise to the problem of solution leakage and makes it possible to form a thin electrolyte layer. The application of polymeric thin layer to a solid electrolyte layer advantageously makes it possible t prepare a paper-like and light secondary cell excellent in flexibility and processing characteristics.

Solid electrolyte layer as above mentioned brings about such troubles that the layer is poor in durability because it is liable to absorb water and being subjected to oxidizing; initial properties, even if being excellent, are deteriorated by the repetition of charging-discharging process; electrical conductivity is about 100–10000 times lower than that of a electrolyte solution of lithium etc. The fact is that various researches and developments about new solid electrolyte are actively in progress for the practical use.

SUMMARY OF THE INVENTION

The object of the invention is to provide a secondary cell comprising new solid electrolyte with low electrical conductivity and that without such problems as a leakage of electrolyte solution and poor durability resulted from the decomposition of electrolyte etc.

DETAILED DESCRIPTION OF THE INVENTION

Figure 1:
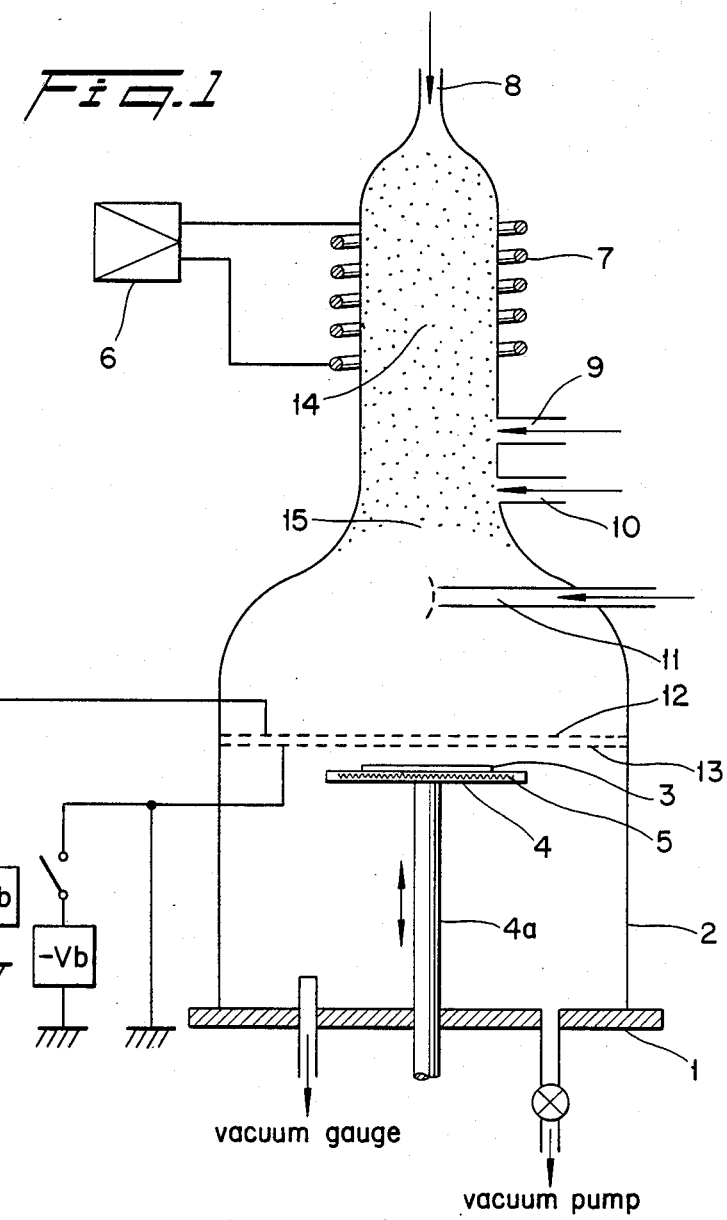
FIG. 1 illustrates of an example of a plasma-polymerization equipment for the production of a solid electrolyte layer.

The present invention provides a secondary cell excellent in durability, electric capacity and charging and discharging cycle-properties. The electrolyte layer of a secondary cell of the invention is composed of new solid electrolyte which comprises a plasma-polymerized layer of an organic compound containing an alkali metal ion and an element with high electronegativity.

A secondary cell of the invention is usually composed of at least a negative electrode, an electrolyte layer and a positive electrode, wherein the electrolyte layer is a solid electrolyte layer comprising a plasma-polymerized layer of an organic compound containing an alkali metal ion and an element with high electronegativity.

An alkali metal ion contained in a solid electrolyte layer of the invention is exemplified by lithium ion, sodium ion, potassium ion and the like. Lithium ion is preferred.

A element with high electronegativity is meant to be nitrogen, oxygen, sulfur, fluorine, chlorine. These elements may be contained as elements, ions of elements, or organic polar groups containing the elements.

The content of an alkali metal ion (preferably lithium) ion in an solid electrolyte of the invention, varying on a layer quality of a plasma-polymerized layer, is 7–65 atomic % (hereinafter abbreviated as "atm. %"), preferably 9–50 atm. % on the basis of total number of atoms in the solid electrolyte. If the content is less than 7 atm. %, sufficient electric conductivity is not achieved. It is restricted from the productive view to contain lithium ion more than 65 atm. %.

The above mentioned content may be measured by, for example, elemental analysis, NMR, Auger analysis, plasma emission analysis (ICP) and so on. The content is measured by ICP to show the results in the invention.

The electroconductivity of an electolyte layer of the invention is much affected by the content of alkali metal in the layer, the content of an element with high electronegativity, or layer qualities. In particular, it is preferred to prepare a relatively flexible plasma-polymerized layer under adequately selected conditions, because a plasma-polymerized layer can show various properties depending on the productive conditions. According to the invention, a plasma-polymerized layer within the range of $5 \times 10^{-6} - 1 \times 10^{-1}$ (S/cm) in electric conductivity at 25° C. can be prepared and it can function well as an electrolyte layer of a secondary cell.

The reasons why an electrolyte layer of the invention is much improved in electric conductivity may be thought as below; An element with high electronegativity functions to electrically attracted alkali metal ions, therefore the electrostatic attraction force is weakened between an alkali metal ion such as lithium ion and an anion as a counter ion existing in a solid electrolyte layer, thereby anions come to move easily.

Any materials per se known can be applied to a negative or a positive electrode. Materials for a negative electrode are exemplified by pure lithium, alkali metal-containing materials such as lithium-aluminium alloy, or Wood's metal (alloy of bismuth, lead and cadmium). Preferred materials for negative electrode is alkali metal-containing materials or Wood's metal.

Materials for a positive electrode are exemplified by active carbon, titanium disulfide, molybdenum dioxide, molybdenum trioxide, electrically-conductive polymer such as poly-aniline, poly-pyrrole, poly-thiophene. Preferred materials for positive electrode are molybdenum dioxide, molybdenum trioxide, or active carbon.

An electrolyte layer of the invention may be formed through plasma conditions of gases of organic compounds containing alkali metals and organic compounds with high-electronegative elements by plasma methods such as direct current, high frequency, low frequency or micro wave plasma method. The thickness of the layer may be 5–100 μm, preferably 6–60 μm. If the layer thickness is more than 100 μm, cyclic properties of a cell become poor. If the layer thickness is less than 5 μm, sufficient current capacity can't be obtained.

Organic compounds having a group of alcohol or ether, a group of a carbonyl compound, a group of carboxylic acid or ester thereof, a nitrogen-containing group, a sulfur-containing group, or a heterocyclic ring-containing group, organic fluorine compounds or organic chlorine compounds may be used as organic compounds with high electronegative elements.

Groups of alcohols or ethers are exemplified by a hydroxy group (—OH), a methoxy group (—OCH$_3$), an ethoxy group (—OC$_2$H$_5$), a propoxy group (—OC$_3$H$_7$), a butoxy group (—OC$_4$H$_9$), a phenoxy group (—OC$_6$H$_5$), a benzyloxy group (—OCH$_2$C$_6$H$_5$), a epoxy group (cyclic ether), a methylenedioxy group (—OCH$_2$O—), or an ethylenedioxy group (—OCH$_2$CH$_2$O—).

Groups of carbonyl compounds are exemplified by a formyl group (a aldehyde group)(—CHO), a carbonyl group (>CO), an acetonyl group (CH$_3$COCH$_2$—), or a phenacyl group (C$_6$H$_5$COCH$_2$—).

Groups of carboxylic acids or esters thereof are exemplified by a carboxy group (—COOH), a methoxycarbonyl group (—COOCH$_3$), an ethoxy carbocyl group (—COOC$_2$H$_5$), a formyl group (HCO—), an acetyl group (CH$_3$CO—), a propionyl group (C$_2$H$_5$CO—), a butyryl group (C$_3$H$_7$CO—), a valeryl group (C$_4$H$_9$CO—), a hexanoyl group (C$_5$H$_{11}$CO—), an oxalyl group (—COCO—), a succinyl group (—COCH$_2$CH$_2$CO—), a benzoyl group (C$_6$H$_5$CO—), an o-, m-, or p- toluoyl group (CH$_3$C$_6$H$_4$CO—), a α, β-naththoyl group (C$_{10}$H$_7$CO—), a salicyloyl group (HOC$_6$H$_4$CO—), a cinnamoyl group (C$_6$H$_5$CH=CHCO—), a phthaloyl group (C$_6$H$_4$(CO—)$_2$), an acetoxy group (CH$_3$COO—), a benzoyloxy group (CH$_3$COO—).

Nitrogen-containing groups are exemplified by a nitro group (—NO$_2$), a nitroso group (—NO), an amino group (—NH$_2$), a methylamino group (CH$_3$NH—), dimethylamino group ((CH$_3$)$_2$N—), an anilino group (C$_6$H$_5$NH—), an acetamido group (CH$_3$CONH—), a benzamido group (C$_6$H$_5$CONH—), an imino (=NH), a phenylimino group (=N—C$_6$H$_5$), a hydroxy amino group (=N—OH), a hydroxyimino group (=N—OH), a nitroamino group (—NHNO$_2$), a hydrazino group (—NHNH$_2$), an azo group (—N=N—), a diazo group (N$_2$=), an azoxy group

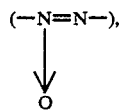

a hydrazo group (—NHNH—), a phenyl azo group (C$_6$H$_5$—N=N—), a cyano group (—CN), an isocyano group (CN—), a carbamoyl group (NH$_2$CO—), an ureido group (NH$_2$CONH—), an amidino group (H$_2$N—C=NH), a guanidino group ((H$_2$N)(NH)C=NH).

Sulfur-containing groups are exemplified by a thio group (—S—), a mercapto group (—SH), a sulfinyl group (—SO—), a sulfonyl group (—SO$_2$), a sulfo group (—SO$_3$H), a sulfamoyl group (—SO$_2$NH$_2$), a methylthio group (CH$_3$S—), an ethylthio group (C$_2$H$_5$S—), a tosyl group (CH$_3$C$_6$H$_4$SO$_2$—).

Heterocyclic ring—containing groups are exemplified by a α-furyl group, a β-furyl group, a β-furfuryl group, a α-thienyl group, a β-thienyl group, a α-thenyl group, a β-thenyl group, a α-pyrrolyl group, a β-pyrrolyl group, a α-pyridyl group, a β-pyridyl group, a γ-pyridyl group.

Organic chlorine compounds are exemplified by vinyl chloride, or vinylidene chloride.

Organic fluorine compounds are exemplified by vinyl fluoride, vinylidene fluoride, chloro-trifluoroethylene, tetrafluoroethylene, α,β,β-tri-fluorostyrene, 2,3,4,5,6-pentafluorostyrene, octafluorostyrene, fluoroalkyl (meta)acrylate represented by the formula;

Wherein
R is hydrogen or methyl;
X is hydrogen or fluorine; n is an integer of 1-18;
fluoroalkyl ((C$_n$F$_{2n}$)X) may be linear or branched.

Above mentioned compounds are not always gas, but may be liquid or solid materials at normal temperature providing that the materials can be vaporized through melting, vaporization, sublimation, or the like when heated or vacuumed.

Compounds containing alkali metals are exemplified by lithium alkoxide such as lithium tertiary butoxide, lithium methoxide; organic lithium compounds such as methyl lithium, butyl lithium, phenyl lithium, lithium methacrylate, lithium phthalocyanine; lithium hydride such as lithium aluminium hydride; lithium amide such as lithium bis(trimethylsilyl) amide.

Above mentioned compounds containing alkali metals are also not always gas but may be liquid or solid materials at normal temperature providing that the materials can be vaporized through melting, vaporization, sublimation, or the like when heated or vacuumed.

Because a plasma polymerization layer, as aforementioned, shall have layer qualities with various kinds of properties depending on production conditions, it is necessary to select adequate condition.

An example of an equipment for the production of a solid electrolyte layer of the invention was shown in FIG. 1.

In FIG. 1, (1) is a baseplate, on which a bell-jar (2) is set hermetically. Air inside the bell-jar (2) is vacuumized with a vacuum pump (not shown in FIG. 1) to the level of 1×10$^{-5}$ Torr. The vacuum level is measured by a vacuum indicator (not shown in FIG. 1).

A substrate holder (4), on which the substrate (3) is put, can move up and down as a bearing rod (4a) was fitted so as to move freely up and down through the baseplate (1). Therefore the up-and-down position of a substrate can be changed. The substrate holder (4) is equipped with a heater (5) for heating of substrate and, if necessary, the substrate (3) can keep a temperature constantly with the help of external control circuit for temperature adjustment. A temperature sensor for the detection of the temperature of the substrate (3) is set at a appointed position on the substrate holder. Further, a water cooler (not shown) may be attached to the substrate (3) in consideration that the substrate (3) is needed to be cooled.

A high frequency coil (7) which is connected to RF power supply (6) is equipped around small diameter part above the bell jar (2). The high frequency coil (7) generates magnetic induction to works to change inserted gases to plasma conditions. By the way, a water circulating pipe for cooling is attached to the high frequency coil.

Carrier gases are introduced through a gas inlet (8) at the top of the bell jar (2). As to carrier gases, helium (He), neon (Ne), argon (Ar) and the like are applicable. Raw material gases for the formation of a layer on the substrate (3) are introduced through three gas inlets (9), (10), (11) under the high frequency coil (7). The raw materials may be vapor, liquid or solid at normal temperature. If they are liquid or solid, there may be vaporized in vacuum by heating with a heat controller to be introduced under gaseous conditions. In the invention, main component gases for a layer formation are introduced through the first and the second raw material gas inlets (9), (10). Gases for blend are introduced through the third raw material gas inlet (11). As to gases for blend, oxygen gas, nitrogen gas, $N_2O$ and the like are used to incorporate them in an electrolyte layer. Gases for blend is incorporated to adjust the amount oxygen atom, nitrogen atom and the like. Monomer gases containing oxygen, nitrogen, sulfur, fluorine, chlorine and the like may be introduced through the third raw material gas inlet. It is described as above mentioned that raw material gases are introduced through the inlets (9) and (10), but gas mixture of raw material gases with blend gases such as $O_2$ gas and the like may be introduced into the gas inlets (9), (10), and all gases to be introduced into the bell jar (2) may be mixed to introduced through one of inlets (9) (10) and (11). By the way, FIG. 1 is shown as if the end of cylindrical pipe of the third gas inlet (11) were positioned at the center of the bell jar (2), but, it is shown so for the convenience of explanation. In practice, the end of cylindrical pipe of the third gas inlet (11) is opened perpendicularly to the ground, so that gas materials may be mixed better and that the ununiform formation of a layer may be prevented. The reason why three gas inlets are set is to change the distance between a position of a discharge electrode (or high frequency coil (7)) and a position of a raw material gas introduction, whereby it is intended to control kinds of free radicals or active species, and the life of ions in order to change a layer structure (a layer quality). That is, a kind of species depositing on a substrate can be selected, whereby the composition of a layer, the structure of a layer and the quality of a layer can be changed. From the similar object point, a substrate holder (4) can move up and down so that the number of radicals which reach the substrate may be changed.

Two mesh electrodes (12) and (13) made of metal are set at a specified interval parallel to a substrate holder (3) between the substrate (4) and the third gas inlet (11) at the lowermost position among the three raw material inlets in a bell jar (2).

DC voltage of $+Vb$ can be applied to the upper mesh electrode (12) and earth voltage or DC voltage of $-Vb$ can be applied to the lower mesh electrode (13). The mesh electrodes (12), (13) works as a grid to collect electrons and charged particles in plasma conditions and thereby to prevent plasma bombardment. Electrically conductive filter with, for example numerous pores may be applicable as well as a mesh electrodes. It is, although, most preferable to use a mesh electrode in order to prevent jamming. Mesh electrodes other than the two mesh electrodes (12), (13) as shown in FIG. 1 may be set in consideration of the collect efficiency and the collect control and the like. Further, the net size of mesh electrodes is within 8 mm square, preferably 1-4 mm square. If the size is bigger than 8 mm square, there arises such a trouble that electrons and charged particles leaks through the mesh squares and the effect that drive only radicals (neutral species) to a substrate (3) is reduced to half. To the contrary, if the size is smaller than 1 mm square, the adherence of charged particles to a substrate (3) results in the decrease of the number of radicals which reach the substrate (3) and much low deposition rate on the substrate (3).

A production equipment system of a solid electrolyte layer without mesh electrodes needs higher power in some degree to keep an adequate deposition rate. But, the application of higher power results in the deterioration of layer quality in proportion to plasma decomposition caused by plasma damages as plasma condition region broadens to near the substrate. There also arises such unpreferable influences as it becomes difficult to incorporate alkali metals such as Li and the like smoothly into a layer, or it becomes hard to introduce alkali metals such as Li and the like into a layer because of the progress of crosslinking in the layer. As both mesh electrodes above mentioned remove the species which cause plasma-damages, only neutral radicals and other excited neutral species contribute to a layer deposition. Therefore, a thin layer with desired functions can be formed as the deposition rate which making the industrial business pay are kept.

On the other hand, it is found preferable in the invention that raw material gases are not changed directly to plasma conditions but they are excited indirectly and that mildly by contact with Ar plasma or He plasma. It is thought radicals (neutral species) diffuse mainly over a substrate to deposit on the substrate. Therefore, negligible influences, if any, of bombardment by charged particles and electrons is thought to make it possible to improve qualities of polymeric solid electrolyte. The distance between the inlet (9) and the inlet (10) is about 2 cm in the examples described below.

FIG. 1 illustrates plasma equipment of inductive coupling type, but the utility of a plasma equipment of capacitive coupling type is not restricted. The latter equipment needs some contraviance to diffuse radical neutral species to a substrate, for example, so that a substrate may be floated electrically or vias voltage may be applied. A layer deposited with a plasma polymerization equipment of inductive coupling type has lower cross-linked degree than that formed with a plasma polymerization equipment of capacity equipment, the layer structure in itself is a more flexible net structure, and the density of alkali metal is higher. For those reasons as above mentioned, the ion mobility is thought to be improved.

An effect accompanied inevitably by the present invention is the easiness of the formation of a thin secondary cell. It is difficult to form a thin layer of usual polymers in thickness of a few $\mu m$—several tens $\mu m$ by coating methods such as a dipping method, a spray method, a casting method because the necessity to lower the viscosity of binder resin to a considerable degree or to dilute binder resin with solvent results substantially in small content of polar groups or alkali metals. According to plasma polymerization, it is easy to form a thin layer because raw materials are directly polymerized and the layer thickness can be controlled depending only on time.

EXAMPLE

Figure 2:
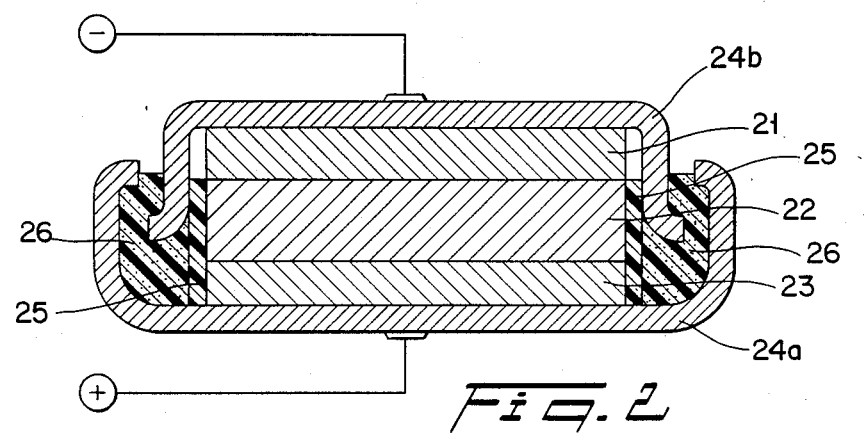
FIG. 2 illustrates a schematic sectional view of a secondary cell prepared in examples.

The structure of a secondary cell prepared in this example was shown in FIG. 2.

In FIG. 2, (24a) and (24b) shows up-and-down separate stainless caps made of stainless and having 25 mm in diameter and 2 mm in thickness. A secondary cell was prepared by laminating a negative electrode (21), a solid electrolyte layer (22) and a positive electrode (23) on the separate stainless cap (24a) in that order. The secondary cell was protected with a protective layer (25) of plasma polymerized layer of vinylidene fluoride formed at the side of the secondary cell, and was further packaged with the separate stainless cap (24b) from the upper side to resist circumferences and deterioration. The secondary cell was encapsulated with epoxy resin and the up-and-down stainless caps also serve to taking out the electrode.

(positive electrode)

$MoO_3$, which is used for electron beam vapor deposition, was cut out in thickness of 100 μm to be adhered on the lower stainless cap (24a). The lead line made of metal was bonded onto the positive electrode as shown in FIG. 2.

(solid electrolyte)

A solid electrolyte layer of about 10 μm was formed on the positive electrode with the equipment for the production of solid electrolyte shown FIG. 1 under plasma conditions below

| | |
|---|---|
| He gas from the carrier inlet (8) | 30 sccm |
| Lithium-t-butoxide from the raw material gas inlet (9) | 30 sccm |
| Lithium methylmethacrylate monomer from the inlet (10) | 35 sccm |
| 100% $O_2$ gas from the inlet (11) | about 1.5 sccm |
| Pressure inside bell jar (absolute value; measured by vacuum gauge of diaphragm type) | 0.8 Torr |
| RF frequency | 13.56 MHz |
| Power supply | 80 W |
| mesh voltage (+Vb) | +5 V |
| mesh voltage (−Vo) | −5 V |

The resultant solid electrolyte layer had $1.9 \times 10^{-2}$ (S/cm) in electrical conductivity. The heater (5) and the water cooler was not worked at the plasma-polymerization. The substrate on the substrate holder showed normal temperature (−30° C.) at the initial stage of the polymerization and it was gradually heated by energies generated by plasma during plasma-polymerization to show about 80° C. at the final stage. It might be necessary to operate the water cooler when the substrate (3) came to have abnormally high temperature in relation to the balance of provided voltage. Lithium t-butoxide made by Kojundo Kagaku Kenkyusho K.K. and having the boiling point of 110° C./0.1 mmHg was used. It was heated adjusting the temperature by an electron constant temperature equipment of circulating type to be vaporized. The vapor of Lithium t-butoxide was transported into the bell jar (2) as the vapor pressure of Lithium butoxide was kept constantly. When it deposited as above mentioned, polymeric layer was deposited at the layer-forming rate of about 7 μm/h.

(Protective layer)

A protective layer of 2 μm in thickness of plasma polymerized layer was formed around the side of the resultant laminated layers of the solid electrolyte layer on the positive electrode formed over the lower stainless cap (24a).

Plasma polymerization was carried out with the equipment shown in FIG. 1. Vinylidene fluoride was used as raw material gas, and plasma-polymerized under such conditions as flow rate of 50 sccm, inner pressure of 1.0 Torr, electric power of 20 Watts.

(negative electrode)

Li-Al alloy of 70 μm in thickness adhering on the upper stainless cap (24b) was contact-bonded onto the solid electrolyte (22) to form a negative electrode.

A lead line made of gold metal was bonded onto the stainless cap adhering to the negative electrode. By the way, Li-Al alloy layer may be formed by mean of binary sputtering method.

(Package)

Epoxy resin was introduced for encapsulating between the upper and lower separate stainless caps. The upper separate stainless cap was electrically insulated from the lower separate stainless cap.

In this embodiment, stainless cap was employed. The present invention is not limited to this but insulated film of which a conductive layer is formed on the surface may be employed. In this embodiment, epoxy resin was employed as the resin for encapsulation. The present invention is not limited to this but polycarbonate resin and polypropylene resin may be employed.

EXAMPLE 2

A secondary cell was prepared similarly as EXAMPLE 1 except that a poly-pyrrole layer of 50 μm in thickness was applied to a positive electrode, a Li-vapor-deposited layer of 30 μm in thickness was applied to a negative electrode and a solid electrolyte layer was formed to be about 11 μm in thickness by plasma-polymerization of Lithium methacrylate (Li-MA) (made by Asada Kagaku K.K.) instead of Lithium-t-butoxide in EXAMPLE 1 under such conditions as the flow rate of Li-MA of 45 sccm, layer formation rate of about 6.5 μm/h.

The resultant solid electrolyte layer showed $4.5 \times 10^{-3}$ (S/cm) of electrical conductivity.

EXAMPLE 3

A secondary cell was prepared similarly as EXAMPLE 2 except that a molybdenum trioxide ($MoO_3$) layer of 90 μm in thickness was applied to a positive layer, a Li-vapor-deposited layer of 30 μm in thickness was applied to a negative electrode and a solid electrolyte layer was formed to be about 10.2 μm in thickness by plasma-polymerization under such conditions as the flow rate of Li-MA of 50 sccm, the flow rate of thiophene of 20 sccm instead of oxygen blending gas, and layer formation rate of about 8.9 μm/h.

The resultant solid electrolyte layer showed about $7.8 \times 10^{-4}$ (S/cm) of electrical conductivity.

EXAMPLE 4

A secondary cell was prepared similarly as EXAMPLE 1 except that a poly-pyrrole layer of 10 μm in thickness was applied to a positive electrode, a Li vapor-deposited layer of 20 μm in thickness was applied to a negative electrode and a solid electrolyte layer was formed to be about 10 μm in thickness by plasma-polymerization of Li-MA instead of Lithium-t-butoxide in EXAMPLE 1 and additional tetrafluoroethylene under such conditions as the flow rate of Li-MA of 38 sccm, the flow rate of tetrafluoroethylene of 5 sccm, layer formation rate of about 4.9 μm/h.

The resultant solid electrolyte layer showed $2.1 \times 10^{-4}$ (S/cm) of electrical conductivity.

COMPARATIVE EXAMPLE 1

$MnO_2$ of 100 μm in thickness was applied to a positive electrode. Li-Al alloy of 50 μm in thickness was applied to a negative electrode. A spacer of 150 μm in thickness was held between the two electrode and a 1M solution of lithium perchlorate in propylene carbonate was poured into the space between the two electrodes. Thereby a secondary cell was prepared. The resultant secondary cell was encapsulated with polypropylene resin.

COMPARATIVE EXAMPLE 2

A secondary cell was prepared similarly as COMPARATIVE EXAMPLE 1 except that an electrolyte layer was prepared by sintering a dispersed solution of lithium tetrafluoroborate ($LiBF_4$) in phosphoric ester to be 170 μm in thickness.

The resultant secondary cell was encapsulated with polycarbonate resin.

EVALUATION OF SECONDARY CELL

Voltage, operating voltage, current capacity and charge-discharge cycle were evaluated on the obtained secondary cells in EXAMPLES 1-4, and COMPARATIVE EXAMPLES 1-2.

TABLE 1

| | external shape (button) (mm) | voltage (V) | operating voltage (V) | current capacity (mA·h) | charge-discharge cycle (times) |
|---|---|---|---|---|---|
| EXAMPLE | | | | | |
| 1 | 25φ × 2 | 3 | 3–1.5 | 9.8 (3→2 V) | >3500 |
| 2 | 25φ × 2 | 3 | 3–1.5 | 6.9 (3→2 V) | >4500 |
| 3 | 25φ × 2 | 3 | 3.5–1.7 | 5.3 (3.5→2.5 V) | >4700 |
| 4 | 25φ × 4 | 3 | 3–1.6 | 5.9 (3.1→2.1 V) | >4100 |
| COMPARATIVE EXAMPLE | | | | | |
| 1 | 25φ × 4 | 3 | 2.5–1.5 | 0.2 (2.5→1.5 V) | about 300 |
| 2 | 25φ × 4 | 3 | 2.4–1.3 | 0.1 (2.4→1.4 V) | about 400 |

What is claimed is:

1. A secondary cell comprising a negative electrode, a solid electrolyte layer, and a positive electrode, wherein the solid electrolyte layer comprises a plasma-polymerized layer of an organic compound which comprises an alkali metal ion and an element having high electronegativity.

2. A secondary cell of the claim 1, wherein the alkali metal ion is a lithium ion.

3. A secondary cell of the claim 1, wherein the element having high electronegativity is oxygen, nitrogen, sulfur, fluorine or chlorine.

4. A secondary cell of the claim 1, wherein the negative electrode is made of an alkali metal-containing metal material or Wood's metal.

5. A secondary cell of the claim 1, wherein the positive electrode is made of an electroconductive metal oxide.

6. A secondary cell of the claim 1, wherein the alkali metal ion is contained at a content of 7-65 atomic % on the basis of total number of atoms in the solid electrolyte.

7. A thin film secondary cell comprising a negative electrode, a solid electrolyte layer which is 5-100 μm in thickness, and a positive electrode, wherein the solid electrolyte layer comprises a plasma-polymerized layer of an organic compound which comprises an alkali metal ion and an element having high electronegativity.

8. A secondary cell of the claim 7, wherein the alkali metal ion is contained at a content of 7-65 atomic % on the basis of total number of atoms in the solid electrolyte.

9. A secondary cell comprising a negative electrode, a solid electrolyte layer, a positive electrode, and a package, wherein the solid electrolyte layer comprises a plasma-polymerized layer of an organic compound which comprises an alkali metal ion and an element having high electonegativity, said package comprising upper and lower separate caps and a resin introduced for encapsulation between said caps.

10. A secondary cell of the claim 9, wherein the package is formed by an electroconductive material.

11. A secondary cell of the claim 10, wherein the upper separate cap is electrically insulated from the lower separate cap.

* * * * *